Oct. 21, 1969  J. H. DUFF  3,473,665
FLOW CONTROL MEANS FOR WATER TREATING APPARATUS
Filed July 31, 1968  2 Sheets-Sheet 1

INVENTOR.
Joseph H. Duff
BY Hume, Clement, Hume & Lee
Attorneys.

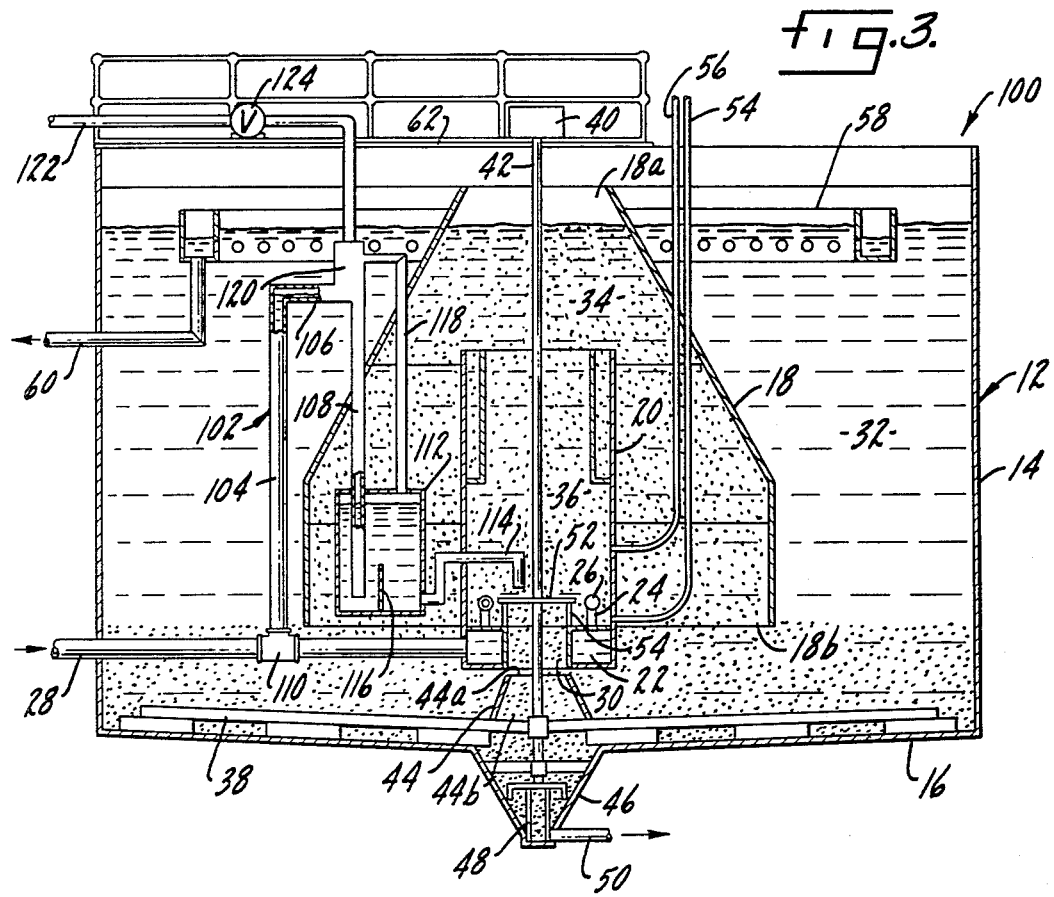

United States Patent Office 3,473,665
Patented Oct. 21, 1969

3,473,665
FLOW CONTROL MEANS FOR WATER TREATING APPARATUS
Joseph H. Duff, Basking Ridge, N.J., assignor to Union Tank Car Company, Chicago, Ill., a corporation of Delaware
Filed July 31, 1968, Ser. No. 749,056
Int. Cl. C02b 1/10; B01d 19/04
U.S. Cl. 210—188                               14 Claims

ABSTRACT OF THE DISCLOSURE

In a water treating apparatus having a liquid input conduit and one or more inlet nozzles, flow control means are provided for varying the overall liquid input rate while maintaining a substantially constant flow rate at the nozzles. In the first embodiment, the flow control means comprise a tank having a weir, preferably of adjustable height, separating it into an inlet compartment and an outlet compartment. The weir has an upper edge above the level of the nozzle. The inlet compartment communicates with the inlet conduit, while the outlet compartment communicates with the interior of the apparatus. In the second embodiment, the flow control means include a pipe having an inverted U-shaped section, the uptake side of which is connected to the liquid input conduit, and the downtake side of which communicates with the interior of the water treating apparatus. Gas pressure means communicate with an upper portion of the inverted U-shaped section, providing control over the input pressure required for liquid to flow over the top of the inverted U-shaped section.

---

The present invention relates to improvements in the art of liquid flow control, and more specifically to an improved water treating apparatus incorporating improved flow control means.

A particularly successful apparatus for the purification of water is known in the art as a "Reactivator." A preferred embodiment of this device is described and claimed in co-pending application Ser. No. 499,756, filed Oct. 21, 1965, now U.S. Patent No. 3,397,788, which is assigned to the assignee of this application. Basically, the reactivator comprises means forming a plurality of water treating zones, means forming a settling zone, means forming a recirculation zone, and means forming an uptake zone. The bottom of the uptake zone is closed except for an opening substantially in the center through which it communicates with the mixing and recirculation zone and with the settling zone. The upper portion of the uptake zone communicates with the mixing and recirculation zone, and the mixing and recirculation zone, in turn, communciates with the settling zone. The apparatus includes means for supplying a coagulant into the uptake zone and means for withdrawing effluent liquid from the settling zone. In order to achieve swirling within the uptake zone, together with high recirculation rates in comparison with the total throughput rate of the apparatus, the uptake zone includes at least one, and preferably a plurality of nozzles which direct influent liquid into it. The influent liquid is fed to the nozzles through a liquid input conduit.

A particularly critical feature of the above-described water treating apparatus is the requirement for control of the quantity of solids in circulation in the machine. This should be maintained at an optimum range to insure the presence of a sufficient supply of solids to accomplish coagulation and clarification, while limiting the quantity of solids to avoid carry-over with the treated water. When the liquid throughput rate of the apparatus varies, the recirculation rate will also vary, which, in turn, will alter the quantity of solids in circulation. In order to compensate for variations in the throughput rate, it has heretofore been necessary to regulate the angle of the input nozzles within the uptake chamber. This process requires that the apparatus be emptied of liquid so that the nozzles can be manually adjusted, and is therefore somewhat impractical, especially if frequent variations of the throughput rate are encountered.

Difficulty is also encountered in the inability of the nozzles to handle large variations in liquid input rates. This is true because the pressure drop at the nozzles varies approximately in proportion to the square of the liquid input rate. Clearly, this relationship severely limits the range of throughput rates that can be tolerated in a reactivator of the type described in U.S. Patent No. 3,397,788.

Generally, the present invention provides flow control means for use in a water treating apparatus having an inlet nozzle together with a liquid input conduit for delivering liquid under pressure to the nozzle. The invention has two basic embodiments. In the first embodiment, a flow control tank is employed having an internal weir separating the tank into an inlet compartment and an outlet compartment. The weir has an upper edge above the level of the nozzle. A flow control inlet conduit connects the liquid input conduit to the inlet compartment of the tank, and a flow control outlet conduit connects the outlet compartment with the interior of the water treating apparatus. Thus, when the input pressure exceeds the pressure head represented by the height of the weir, the input liquid will flow over the top of the weir, bypassing the nozzles, passing directly to the interior of the water treating apparatus.

In the second embodiment, a flow control pipe having an inverted U-shaped section is employed. The uptake side of the U-shaped section is connected to the input conduit and the downtake side communicates with the interior of the water treating apparatus. Gas pressure means communicates with an upper portion of the inverted U-shaped section through conduit means. In this embodiment, when the input pressure exceeds a level corresponding to the pressure head represented by the level of the top of the U-shaped section together with the pressure head of the gas, liquid will flow through the U-shaped section directly into the apparatus, bypassing the nozzles.

The invention, both as to its organization and method of operation, together with the objects and advantages thereof, will be best understood by references to the following detailed descriptions taken in conjunction with the accompanying drawings, in which:

FIGURE 3 is a vertical cross-sectional view of a second water treating apparatus embodying the features of the present invention.

Figure 1:
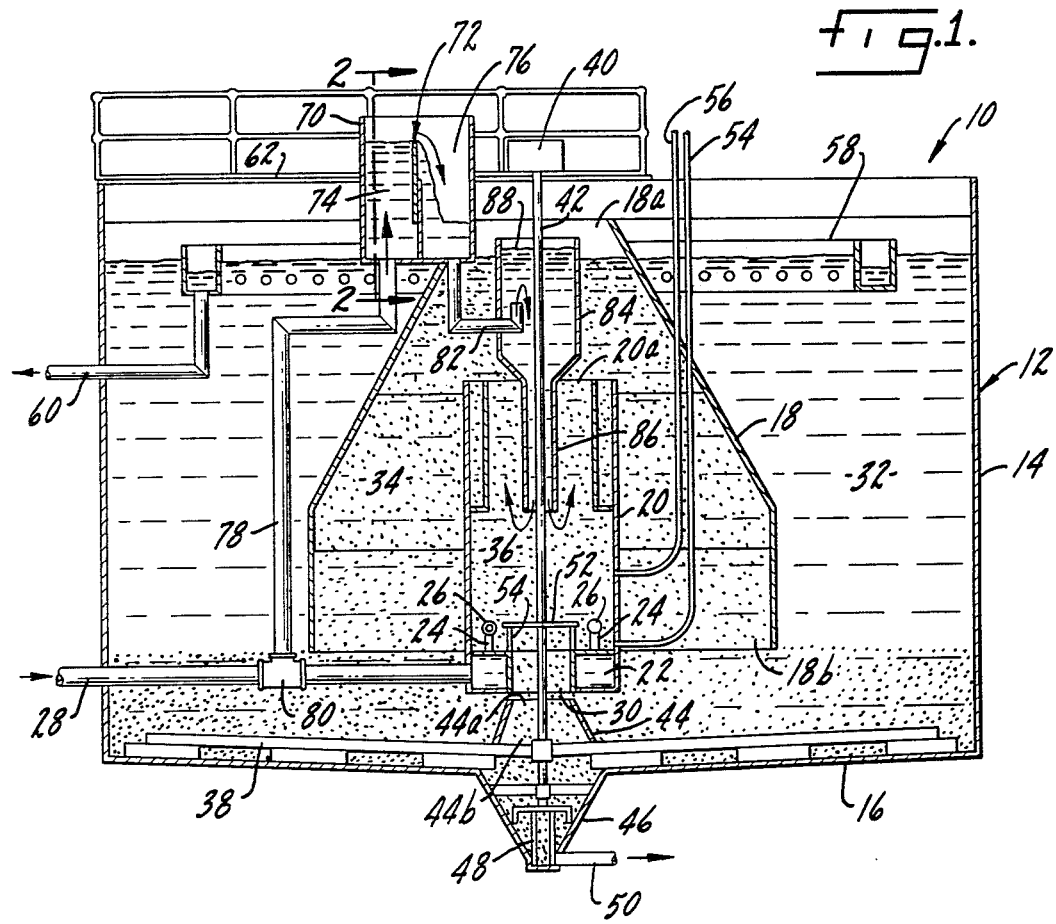
FIGURE 1 is a vertical cross-sectional view of a water treating apparatus embodying the features of the present invention.

Referring to FIGURE 1, there is illustrated a water treating apparatus, generally indicated by reference numeral 10, embodying the features of the present invention. The apparatus 10 is of the type well known in the art for softening water by the cold lime-soda ash process, and for the clarification of waters containing suspended solids, color, and organic impurities by coagulation with alum or ferric sulfate or other coagulants. Coagulation and softening may be carried out simultaneously in this type of water treating apparatus. The coagulants or precipitates formed within the apparatus have a tremendous surface area upon which the dissolved or colloidally dispersed impurities are absorbed. The suspended impurities are surrounded by the gelatinous precipitates and themselves become part of the precipitate.

To soften water by this process, lime (calcium hydroxide) is added to precipitate the calcium bicarbonate as calcium carbonate and the magnesium salts as magnesium hydroxide. Soda ash (sodium carbonate) is added to react with the calcium chloride and calcium sulfate originally present in the water as well as that formed by the reaction of lime with magnesium chloride and sulfate. The reaction of sodium carbonate with these salts forms calcium carbonate. Thus, the hardness (calcium and magnesium salts) originally present in the water is partially removed as the slightly soluble compounds, calcium carbonate and magnesium hydroxide, precipitate.

Usually a coagulant such as alum, sodium aluminate, or ferric sulfate is employed in the treatment to assist in the separation of the turbidity and precipitates formed from the water. If sterilization and reduction in organic matter are required, chlorine is also used in the treatment. By suitable modification in the chemical treatment, silica reduction can be obtained.

The water treating apparatus 10 comprises an open tank 12 having a cylindrical side wall 14 and a bottom 16. Mounted therein is an inverted, generally frusto-conical partition member 18 having an upper opening 18a and a lower opening 18b. A generally cylindrical uptake member 20 is mounted within the partition member 18. As used herein, generally cylindrical includes substantially regular polygonal shapes having more than four sides. The uptake member 20 has an upper opening 20a. The bottom of the uptake member 20 forms an annular distribution chamber 22 to which a plurality of lines 24 are attached. For simplicity of illustration, only two such lines 24 are shown in the drawing, although a larger number may be employed. Each of these lines 24 terminates in a nozzle 26. Each nozzle 26 can be rotated in a vertical plane about a 180 degree angle, so that the recirculation rate of the apparatus may be adjusted. Untreated water is fed under pressure into the annular distribution chamber 22 through a liquid input conduit 28. This water is delivered to the nozzles 26 through the connecting lines 24. The annular distribution chamber 22 forms a central opening 30 at the bottom of the uptake member 20.

The partition member 18 and the tank 12 form an annular settling zone 32. The uptake member 20 and the partition member 18 form an annular mixing and recirculation zone 34. The uptake member 20 forms an uptake zone 36 which communicates at its upper opening 20a with the mixing and recirculation zone 34. The uptake zone 36 communicates with the lower portion of the settling zone 32 through the opening 30.

Mounted within the lower portion of the settling zone 32 is a scraper 38 which rotates to cover the entire bottom 16 of the tank 12. The scraper 38 is driven by a motor 40 mounted on top of the tank 12 through a drive shaft 42 which extends through the uptake zone 36.

A hollow, inverted, frusto-conical funnel member 44 is attached to the scraper 38 and has upper and lower openings, 44a and 44b respectively. The lower opening 44b is directed toward a sludge pit 46 and the upper opening 44a is directed toward the opening 30 in the bottom of the uptake member 20. Recirculated precipitates pass upwardly through the funnel member 44, through the opening 30, and into the bottom of the uptake zone 36.

The sludge pit 46 is positioned centrally in the bottom 16 of the tank 12, and is below the funnel member 44. Sludge thickeners 48 are rotatably driven through the shaft 42 by the motor 40 along with the scraper 38. Sludge is removed from the sludge pit 46 through a sludge removal line 50, as is well known in the art.

Though not required, it is preferred to have a plate member 52 supported by legs 54 above the opening 30 in the bottom of the uptake member 20. The plate member 52 is level with or slightly above the nozzles 26, and improves the efficiency of the pumping action effected by the nozzles 26.

The nozzles 26 direct the inlet water into the uptake zone 36 in such a direction to cause rotation of the body of water therein, and to pump the water upwardly into the mixing and recirculation zone 34, producing recirculation of water and precipitates. The rotation of the water causes a high pressure zone toward the periphery of the uptake zone 36 and a low pressure zone toward the center or axis of the uptake zone 36. In this manner, recirculated precipitates from the settling zone 32 are mixed with the influent water in the uptake zone 36. Chemical treating agents are added to the uptake zone 36 through chemical input lines 54 and 56, and are mixed with the influent water in the uptake zone 36. Treated effluent water is recovered in the annular-shaped collector trough 58 and withdrawn through an effluent outlet line 60. The apparatus is accessible for service from a catwalk 62.

Referring now specifically to the flow control means of the present invention, in one embodiment a flow control tank 70 is fixedly mounted in an upper portion of the apparatus 10 by means not shown in the drawing. Within the tank 70 a weir, generally indicated by reference numeral 72, is positioned, separating the tank 70 into an inlet compartment 74 and an outlet compartment 76. The inlet compartment 74 communicates with the liquid input conduit 28 through a flow control inlet conduit 78 joined to the liquid input pipe 28 at a T-juncture 80. The outlet compartment 76 communicates with the interior of the water treating apparatus 10 through a flow control outlet conduit 82.

In the preferred embodiment, the flow control outlet conduit 86 communicates directly with a gas separation chamber 84 which in turn, communicates with the uptake zone 36 through a vertical pipe 82. As shown in FIGURE 1, the flow control outlet conduit 82 delivers water to the interior of the gas separation chamber 84 in an upward direction. This aids in the release of entrapped gas at the air-water interface 88 at the top of the gas separation chamber 84.

In the most preferred embodiment of the present invention, the weir 72 is formed of a fixed lower weir section 72a and a movable upper weir section 72b, so that the height of the weir 72 may be adjusted.

Figure 2:
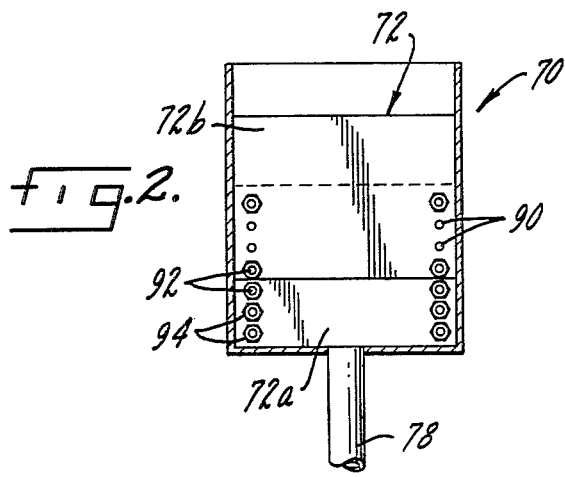
FIGURE 2 is a cross-sectional view taken along line 2—2 of FIGURE 1.

Referring to FIGURE 2, each of the weir sections 72a, 72b has a plurality of spaced apertures 90 along the sides thereof. These apertures are alignable in various positions, so that the upper weir section 72b may be affixed to the lower weir section 72a at various heights by bolts 92 and hex nuts 94. To prevent the escape of liquid through the weir, the lower apertures in the fixed weir section 72a have bolts 92 and hex nuts 94 inserted. As explained herein, the height of the weir 72 will control the maximum pressure that can be achieved in the liquid input conduit 28, and the maximum input rate at the nozzles 26.

During operation, the raw or influent water enters the apparatus 10 through the liquid input conduit 28. In this instance, it will be assumed that the pressure of the influent liquid is slightly greater than the pressure head corresponding to the height of the adjustable weir 72, as is normally true. A portion of the influent water is delivered to the annular distribution chamber 22, through the lines 24 to the nozzles 26, which eject it into the uptake chamber 36 with a swirling motion as previously described. As the influent water rotates, it is mixed with the recirculated precipitates passing upwardly through the opening 30 at the bottom of the uptake zone 36. The influent water is also mixed with chemicals being added through the chemical input lines 54, 56, and additional precipitates are formed. The influent water is thereby pumped upwardly through the uptake zone 36 and passes over the top of the uptake member 20 into the mixing and recirculation zone 34, where further mixing of the water, precipitated solids, and chemicals occurs.

A substantial portion of the water and suspended precipitates will pass through the funnel member 44 and enter the uptake zone 36 through the opening 30 to be recirculated in the manner previously described, and as is well known in the art. Part of the water enters the settling zone 32 and rises toward the annular-shaped collector trough 58. Precipitates settle out and fall to the bottom 16 of the tank 12.

The settled precipitates or sludge are moved continuously along the bottom 16 toward the center of the apparatus by means of the slowly rotating scraper 38, which covers the entire floor area. The accumulations of precipitates are transferred to the sludge pit 46 where they settle quiescently. The sludge is removed through the sludge removal line 50 and passed to waste. Clear water is collected in the trough 58 and is removed from the apparatus 10 through the outlet line 60.

The remaining liquid that is not delivered to the annular distribution chamber 22 passes through the flow control inlet conduit 78, where it flows over the weir 72 and into the flow control outlet conduit 82. Since air will be entrained in the water as it passes over the weir 72, the water is delivered to the gas separation chamber 84, where the entrained air escapes. In order to insure the escape of the entrained air, it is preferred to limit the flow rate in the air separation chamber 84 to a downward velocity of about 0.25 feet per second or less. The deaerated water is then delivered to the uptake zone 36 through a vertical pipe 86 in the bottom of the gas separation chamber 84. At this point, this portion of the raw water is mixed with the water that has been delivered to the uptake zone 36 through the nozzles 26, as well as with precipitated particles and chemicals which are also in the uptake zone 36.

If the input flow rate in the liquid input conduit 28 is increased, the pressure drop at the nozzles 26, as well as the flow rate through the nozzles 26 will increase only by a very small amount. The remainder of the increased flow will pass through the flow control inlet conduit 78 and over the weir as previously described. If it is desired to alter the flow rate and pressure drop at the nozzle 26, it is simply necessary to adjust the height of the weir. Thus, so long as the input pressure in the liquid input conduit 28 is at least equal to the pressure head represented by the height of the weir 72, a constant recirculation rate is achieved regardless of the total rate of input flow.

Referring now to FIGURE 3, there is shown a second water treating apparatus, generally indicated by reference numeral 100. With the exception of the flow control means, this second apparatus 100 is identical to the water treating apparatus 10 shown in FIGURE 1, and identical parts are designated with like reference numerals. With regard to these parts, the description in connection with FIGURE 1 applies equally to FIGURE 3.

Referring to the second embodiment of the flow control means of the present invention, a flow control pipe, generally 102, is mounted within the apparatus 100, preferably below the normal water level so that it will not be subjected to dirt, freezing, etc. As shown in FIGURE 3, the flow control pipe 102 has an inverted U-shaped section having an uptake side 104, an upper section 106, and a downtake side 108. The uptake side 104 of the flow control pipe 102 communicates with the liquid input conduit 28 at a T-juncture 110. The downtake side 108 communicates with the interior of the water treating apparatus 100.

In the preferred embodiment, the downtake side 108 of the flow control pipe 102 communicates directly with a gas separation chamber 112 which, in turn, communicates with the uptake zone 36 through pipe 114, delivering water through the uptake member 20. As those skilled in the art will readily understand, any of a wide variety of gas separation chamber designs may be employed. In the most preferred embodiment, the gas separation chamber 112 includes a weir 116 over which the incoming water must pass before delivery to the input pipe 114. For the maintenance of gas pressure in the system, the gas separation chamber 112 includes gas conduit means 118 communicating with an upper gas chamber portion 120 of the flow control pipe 102. Also communicating with the upper gas chamber portion 120, or with any upper portion of the inverted U-shaped flow control pipe 102, are gas pressure means including a gas pressure conduit 122. The gas pressure conduit 122 communicates with a suitable source of gas pressure (not shown), such as a plant instrument air supply or an air pump. The gas pressure conduit 122 has a pressure regulating valve 124.

During operation, the raw or influent water enters the apparatus 100 through the liquid input conduit 28. The water is delivered to the annular distribution chamber 22 through the lines 24, and out the nozzles 26 into the uptake zone 36. This water is then passed through the device and treated as hereinbefore described in connection with the first embodiment of the present invention, shown in FIGURES 1 and 2. The treated water is eventually withdrawn from the apparatus at the effluent outlet line 60.

The pressure regulating valve 124 is adjusted so that a gas pressure head is delivered to the flow control pipe 102 sufficient to produce a total pressure head (i.e., the gas pressure head plus the pressure head of the water in the uptake side 104 of the flow control pipe 102) which is slightly below the pressure of the water flowing into the apparatus 100 through the liquid input conduit 28.

The liquid that is not delivered to the annular distribution chamber 22 will pass through the uptake side 104, the upper section 106, and down the downtake side 108 of the flow control pipe 102. This water passes into the gas separation chamber 112, over the weir 116, and into the uptake zone 36 through the input pipe 114. At this point, the raw water is mixed with the water that has been delivered to the uptake chamber 36 through the nozzles 26, as well as with the precipitated particles and chemicals in the uptake zone 36.

If the input flow rate in the liquid input conduit 28 increases, the pressure drop at the nozzles 26 is relatively unaffected. Instead, the bulk of the increased flow rate will pass through the flow control pipe 102 and into the uptake zone 36, bypassing the nozzles as previously described. If it is desired to alter the pressure drop at the nozzles 26, it is simply necessary to adjust the gas pressure in the flow control pipe 102 by means of the pressure regulating valve 124. Thus, as long as the input pressure in the liquid input conduit 28 is at least equal to the pressure head represented by the height of the uptake side 104 of the flow control pipe 102, plus the pressure head of the gas delivered through the gas pressure conduit 112, a constant recirculation rate, which is a function of the input rate at the nozzles 26, is achieved regardless of the total input flow rate.

The water treating apparatus of the present invention may be used to treat municipality water, cooling tower make-up water, boiler feed make-up water, white water for paper processing, and the like, as will be understood by those of ordinary skill in the art. It will also be understood that the basic flow control means of the present invention are not limited to use with the specific water treating apparatus described herein, but may be employed in any apparatus where it is desired to provide a constant liquid flow rate at an orifice or nozzle, while varying the overall flow and liquid input rates.

I claim:
1. In a water treating apparatus having means forming a plurality of water treatment zones including an uptake zone, and having a liquid inlet nozzle communicating with said uptake zone and a liquid input conduit for delivering liquid under pressure to said nozzle, the improvement being flow control means for maintaining a substantially constant maximum input rate at said nozzle, said flow control means comprising: a flow control tank having a weir therein, said weir having an upper edge above said nozzle and separating said tank into an inlet compartment and an outlet compartment; a flow control inlet conduit connecting said liquid input conduit to said inlet compartment; and a flow control outlet conduit connecting said outlet compartment with said uptake zone.

2. The water treating apparatus as defined in claim 1 wherein said outlet conduit includes gas separation means.

3. The water treating apparatus as defined in claim 2 wherein the height of said weir is adjustable.

4. In a water treating apparatus having means forming a settling zone, means forming a mixing and recirculation zone, and means forming an uptake zone, the uptake zone having a bottom member with an opening substantially in the center thereof through which said uptake zone communicates with said mixing and recirculation zone and said settling zone, and the upper portion of said uptake zone communicating with said mixing and recirculation zone, said mixing and recirculation zone communicating with said settling zone, and said apparatus having means to supply a coagulant to said uptake zone, means to withdraw effluent liquid from said settling zone, a plurality of nozzles directing influent liquid into said uptake zone, and a liquid input conduit for delivering liquid to said nozzles, the improvement comprising: a flow control tank having a weir therein, said weir having an upper edge above said nozzles and separating said tank into an inlet compartment and an outlet compartment; a flow control inlet conduit connecting said liquid input conduit to said inlet compartment; and a flow control outlet conduit connecting said outlet compartment and said uptake zone.

5. The water treating apparatus as defined in claim 4 wherein said outlet conduit includes gas separation means.

6. The water treating apparatus as defined in claim 5 wherein said gas separation means comprise a gas separation tank having an upper edge above the normal water level in said treating apparatus; means for delivering said liquid from said outlet compartment into said separation tank in a generally upward direction; and means for delivering liquid from a lower portion of said separation tank into said uptake zone.

7. The water treating apparatus as defined in claim 6 wherein the height of said weir is adjustable.

8. In a water treating apparatus having means forming a plurality of water treatment zones including an uptake zone, and having a liquid inlet nozzle communicating with said uptake zone and a liquid input conduit for delivering liquid under pressure to said nozzle, flow control means for maintaining a substantially constant maximum input rate at said nozzle, said flow control means comprising: a flow control pipe having an inverted U-shaped section, the uptake side of said U-shaped section being connected to said liquid input conduit; gas pressure means including conduit means communicating with an upper portion of said inverted U-shaped section; and gas separation means providing communication between the downtake side of said inverted U-shaped section and said uptake zone.

9. The water treating apparatus as defined in claim 8 wherein said inverted U-shaped section includes an upper air chamber portion and conduit means providing communication between said upper air chamber portion, and an upper portion of said gas separation means.

10. The water treating apparatus as defined in claim 9 further including pressure adjusting means on said gas pressure means.

11. In a water treating apparatus having means forming a settling zone, means forming a mixing and recirculation zone, and means forming an uptake zone, the uptake zone having a bottom member with an opening substantially in the center thereof through which uptake zone communicates with said mixing and recirculation zone, and said settling zone, and the upper portion of said uptake zone communicating with said mixing and recirculation zone, said mixing and recirculation zone communicating with said settling zone, and said apparatus having means to supply a coagulant to said uptake zone, means to withdraw effluent liquid from said settling zone, a plurality of nozzles directing influent liquid into said uptake zone, and a liquid input conduit for delivering liquid to said nozzles, the improvement comprising: a flow control pipe having an inverted U-shaped section, the uptake side of said U-shaped section being connected to said liquid input conduit and the downtake side of said U-shaped section communicating with said uptake zone; and gas pressure means including conduit means communicating with an upper portion of said inverted U-shaped section.

12. The water treating apparatus as defined in claim 11 further including gas separation means providing communication between said downtake side of said inverted U-shaped section and said uptake zone.

13. The water treating apparatus as defined in claim 12 wherein said inverted U-shaped section includes an upper air chamber portion and conduit means providing communication between said upper air chamber portion and an upper portion of said gas separation means.

14. The water treating apparatus as defined in claim 13 further including pressure adjusting means on said gas pressure means.

References Cited

UNITED STATES PATENTS

| | | | |
|---|---|---|---|
| 474,685 | 5/1892 | Pennell | 210—188 |
| 1,770,353 | 7/1930 | Weber | 210—74 X |
| 2,422,258 | 6/1947 | Prager | 210—74 X |
| 3,397,788 | 8/1968 | Duff et al. | 210—195 |

JAMES L. DECESARE, Primary Examiner

U.S. Cl. X.R.

210—195, 207, 519, 528